United States Patent
Nam et al.

(10) Patent No.: US 9,518,502 B2
(45) Date of Patent: Dec. 13, 2016

(54) APPARATUS FOR CONTROLLING AIR FLOW TO ENGINE ROOM OF VEHICLE AND AIR FLOW CONTROL SYSTEM INCLUDING THE SAME

(71) Applicant: Hyundai Motor Company, Seoul (KR)

(72) Inventors: Jongwoo Nam, Seoul (KR); Hyun Cho, Seoul (KR); Joonho Lee, Seoul (KR); Hanshin Chung, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 207 days.

(21) Appl. No.: 14/551,038

(22) Filed: Nov. 23, 2014

(65) Prior Publication Data

US 2015/0330288 A1    Nov. 19, 2015

(30) Foreign Application Priority Data

May 13, 2014 (KR) .................. 10-2014-0057018

(51) Int. Cl.
| | |
|---|---|
| *F01P 7/02* | (2006.01) |
| *F01P 7/12* | (2006.01) |
| *F01P 7/08* | (2006.01) |
| *F01P 11/10* | (2006.01) |
| *F01P 11/14* | (2006.01) |
| *B60H 1/00* | (2006.01) |
| *B60K 11/06* | (2006.01) |
| *B60K 11/08* | (2006.01) |

(52) U.S. Cl.
CPC ............. *F01P 7/12* (2013.01); *B60H 1/00764* (2013.01); *B60H 1/00885* (2013.01); *B60K 11/06* (2013.01); *B60K 11/085* (2013.01); *F01P 7/08* (2013.01); *F01P 11/10* (2013.01); *F01P 11/14* (2013.01)

(58) Field of Classification Search
CPC ... B60K 11/04; B60K 11/085; B60Y 2200/90; B60Y 2200/92; B60Y 2306/09; F02B 77/00
USPC .................... 123/41.01, 41.11, 41.49, 41.12; 180/68.1–68.5
See application file for complete search history.

(56) References Cited

U.S. PATENT DOCUMENTS

| | | | | |
|---|---|---|---|---|
| 1,161,444 A | * | 11/1915 | Boughton ................. | E06B 9/40 160/121.1 |
| 1,170,730 A | * | 2/1916 | Benjamin et al. ........ | F01P 7/12 123/41.04 |
| 1,407,216 A | * | 2/1922 | Potter .................. | B60K 11/085 160/130 |
| 1,771,714 A | * | 7/1930 | Lawrence ................ | F01P 7/10 123/41.04 |

(Continued)

FOREIGN PATENT DOCUMENTS

| | | |
|---|---|---|
| JP | 2008-284963 A | 11/2008 |
| KR | 10-2004-0097420 A | 11/2004 |
| KR | 10-2011-0002149 A | 1/2011 |

*Primary Examiner* — John Kwon
*Assistant Examiner* — Tea Holbrook
(74) *Attorney, Agent, or Firm* — Morgan, Lewis & Bockius LLP

(57) ABSTRACT

An apparatus for controlling air flow to an engine room of a vehicle may include vertical support units provided as a pair, a plurality of flaps provided to be unfolded or folded in the vertical support units, a delivery unit configured to selectively fold or unfold the flaps, a rotary unit configured to selectively rotate the flaps, and a controller configured to control operations of the delivery unit and the rotary unit according to operational states of a vehicle.

16 Claims, 10 Drawing Sheets

(56) References Cited

U.S. PATENT DOCUMENTS

| | | | | |
|---|---|---|---|---|
| 1,949,009 | A | * | 2/1934 | Dintilhac ......... G05D 23/27537 123/41.04 |
| 2,246,823 | A | * | 6/1941 | Vollberg ................ F01P 7/12 160/239 |
| 4,779,518 | A | * | 10/1988 | Artwick ................ F24F 7/013 16/360 |
| 7,025,086 | B2 | * | 4/2006 | Maeda ................... F04D 25/14 137/512.1 |
| 8,627,911 | B2 | * | 1/2014 | Tregnago ............ B60K 11/085 180/68.1 |
| 8,922,033 | B2 | * | 12/2014 | Vallinayagam .......... H02K 9/02 290/1 B |
| 8,936,121 | B2 | * | 1/2015 | Vacca ................... B60K 11/04 165/44 |
| 2006/0060401 | A1 | | 3/2006 | Bole |
| 2007/0169725 | A1 | * | 7/2007 | Harich ................ B60K 11/085 123/41.05 |
| 2011/0114286 | A1 | * | 5/2011 | Komatsu ................ B60K 11/04 165/51 |
| 2011/0203861 | A1 | * | 8/2011 | Charnesky ........... B60K 11/085 180/68.1 |
| 2011/0232865 | A1 | * | 9/2011 | Mildner ............... B60K 11/085 165/98 |
| 2013/0264133 | A1 | * | 10/2013 | Remy ................ B60K 11/085 180/68.1 |
| 2014/0094104 | A1 | * | 4/2014 | Manhire .............. B60K 11/085 454/152 |
| 2014/0246863 | A1 | * | 9/2014 | Vallinayagam .......... H02K 9/02 290/1 B |
| 2015/0239337 | A1 | * | 8/2015 | Anderson .............. B60K 11/04 180/68.1 |

* cited by examiner

US 9,518,502 B2

APPARATUS FOR CONTROLLING AIR FLOW TO ENGINE ROOM OF VEHICLE AND AIR FLOW CONTROL SYSTEM INCLUDING THE SAME

CROSS-REFERENCE TO RELATED APPLICATION

The present application claims priority to Korean Patent Application No. 10-2014-0057018 filed May 13, 2014, the entire contents of which is incorporated herein for all purposes by this reference.

BACKGROUND OF THE INVENTION

Field of the Invention

The present invention relates to an apparatus for controlling air flow to an engine room of a vehicle and an air flow control system including the same, and more particularly, to an apparatus for controlling air flow to an engine room of a vehicle and an air flow control system including the same capable of enhancing cooling performance and aerodynamic performance of a vehicle.

Description of Related Art

In general, a radiator for cooling an engine and a condenser for condensing a refrigerant of an air-conditioner are installed in a vehicle, and temperatures of the radiator and the condenser are lowered by driving a cooling fan. When a vehicle is started at an initial stage, it is advantageous for a temperature of an engine to be quickly increased to an appropriate level for the sake of fuel efficiency (or mileage) and it is necessary to maintain the engine at an appropriate temperature.

Conventionally, cooling fans are operated by driving an engine. With this mechanical method, however, when an engine is driven, a cooling fan should be driven all the time, degrading fuel efficiency of a vehicle.

Recently, a method of driving an electrical motor is used. A cooling fan is driven only when necessary according to operational states of a vehicle, improving fuel efficiency, and thus, this method is increasingly used.

Meanwhile, when a running speed of a vehicle increases, aero-dynamic characteristics significantly affect fuel efficiency and speed of the vehicle, and when air introduced to an engine room of the vehicle at a high speed is blocked, drag generated as air passes through the engine room is reduced, improving fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for controlling air flow to an engine room of a vehicle, and an air flow control system including the same, having advantages of enhancing cooling performance and aerodynamic performance of a vehicle.

Various aspects of the present invention are additionally directed to providing an apparatus for controlling air flow to an engine room of a vehicle, and an air flow control system including the same, having advantages of minimizing an operation of a cooling fan and reducing drag by blocking air introduced to an engine room as needed.

According to various aspects of the present invention, an apparatus for controlling air flow to an engine room of a vehicle may include vertical support units provided as a pair, a plurality of flaps provided to be unfolded or folded in the vertical support units, a delivery unit configured to selectively fold or unfold the flaps, a rotary unit configured to selectively rotate the flaps, and a controller configured to control operations of the delivery unit and the rotary unit according to operational states of a vehicle.

The vertical support units may include guide rails having a width narrowed downwardly, wherein stoppers may be provided in the plurality of flaps and have sizes corresponding to widths of the guide rails such that the plurality of flaps may be placed in preset positions of the guide rails.

The delivery unit may include a delivery screw provided in any one of the guide rails, a delivery plate supporting a lowermost flap among the plurality of flaps, and engaged with the delivery screw to adjust the position of the lowermost flap when the delivery screw rotates, and a delivery motor selectively rotating the delivery screw.

The rotary unit may include rotary gears respectively coupled to the plurality of flaps, a rotary screw provided in another guide rail and selectively engaged with the rotary gears, and a rotary motor selectively rotating the rotary screw.

The rotary motor may be a servo motor configured to rotate in forward and reverse directions and is controlled in revolution per minute (RPM) and rotating speed.

The rotary screw may be a flexible gear configured to be selectively engaged with the rotary gears.

The apparatus for controlling air flow to the engine room of the vehicle may further include an operating motor selectively rotating a delivery screw or a rotary screw, in which the delivery unit may include the delivery screw provided in any one of the guide rails and a delivery plate supporting a lowermost flap among the plurality of flaps and engaged with the delivery screw to adjust a position of the lowermost flap when the delivery screw rotates, and the rotary unit may include rotary gears respectively coupled to the plurality of flaps and the rotary screw provided in another guide rail and selectively engaged with the rotary gears.

The operating motor may be a servo motor configured to rotate in forward and reverse directions and controlled in RPM and rotating speed.

The rotary screw may be a flexible gear configured to be selectively engaged with the rotary gears.

The apparatus for controlling air flow to the engine room of the vehicle may further include an operation conversion unit selectively engaging the operating motor and the delivery screw or the rotary screw.

According to various aspects of the present invention, a system for controlling air flow to an engine room of a vehicle may include a fan shroud in which a cooling fan including a fan motor and a fan blade is installed, an apparatus for controlling the air flow to the engine room of the vehicle including vertical support units provided as a pair, a plurality of flaps provided to be unfolded or folded in the vertical support units, a delivery unit configured to selectively fold or unfold the flaps, and a rotary unit configured to selectively rotate the flaps, and a controller configured to control operations of the delivery unit, the rotary unit, and the cooling fan according to operational states of the vehicle.

The fan shroud and the apparatus for controlling the air flow to the engine room of the vehicle may be provided between an engine and a radiator.

The system for controlling air flow to the engine room of the vehicle may further include an encapsulation covering the engine.

Operation modes of the system for controlling the air flow to the engine room of the vehicle may include a first mode in which the plurality of flaps are unfolded to be completely closed and the cooling fan is turned off, a second mode in which an operating rotational angle of the plurality of flaps in the unfolded state is controlled and the cooling fan is turned off, a third mode in which the plurality of flaps in the unfolded state are completely opened and the cooling fan is turned off, and a fourth mode in which the plurality of flaps are folded and an operation of the cooling fan is controlled.

The system for controlling air flow to the engine room of the vehicle may further include an atmospheric temperature sensor configured to measure an atmospheric temperature and output a corresponding signal, a speed sensor configured to measure a speed of the vehicle and output a corresponding signal, an air-conditioning pressure sensor configured to measure internal air-conditioning pressure and output a corresponding signal, an air-conditioning switch sensor configured to measure an operating signal of an air-conditioning switch and output a corresponding signal, and a refrigerant temperature sensor configured to measure a refrigerant temperature and output a corresponding signal, in which the controller may determine an operational state of the vehicle based on the corresponding signals from the sensors, and control operations of the delivery unit, the rotary unit, and the cooling fan in any one of the first to fourth modes according to the operational state of the vehicle.

The system may further include an intercooler temperature sensor configured to measure a temperature of the intercooler and output a corresponding signal, in which the controller may further obtain a signal from the intercooler temperature sensor to determine an operational state of the vehicle, and control operations of the delivery unit, the rotary unit, and the cooling fan in any one of the first to fourth modes.

With the apparatus for controlling air flow to an engine room of a vehicle the air flow control system including the same according to various aspects of the present invention, cooling performance can be enhanced by controlling the use of the cooling fan according to running states of a vehicle and aerodynamic performance can be enhanced by adjusting air flow introduced to a vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
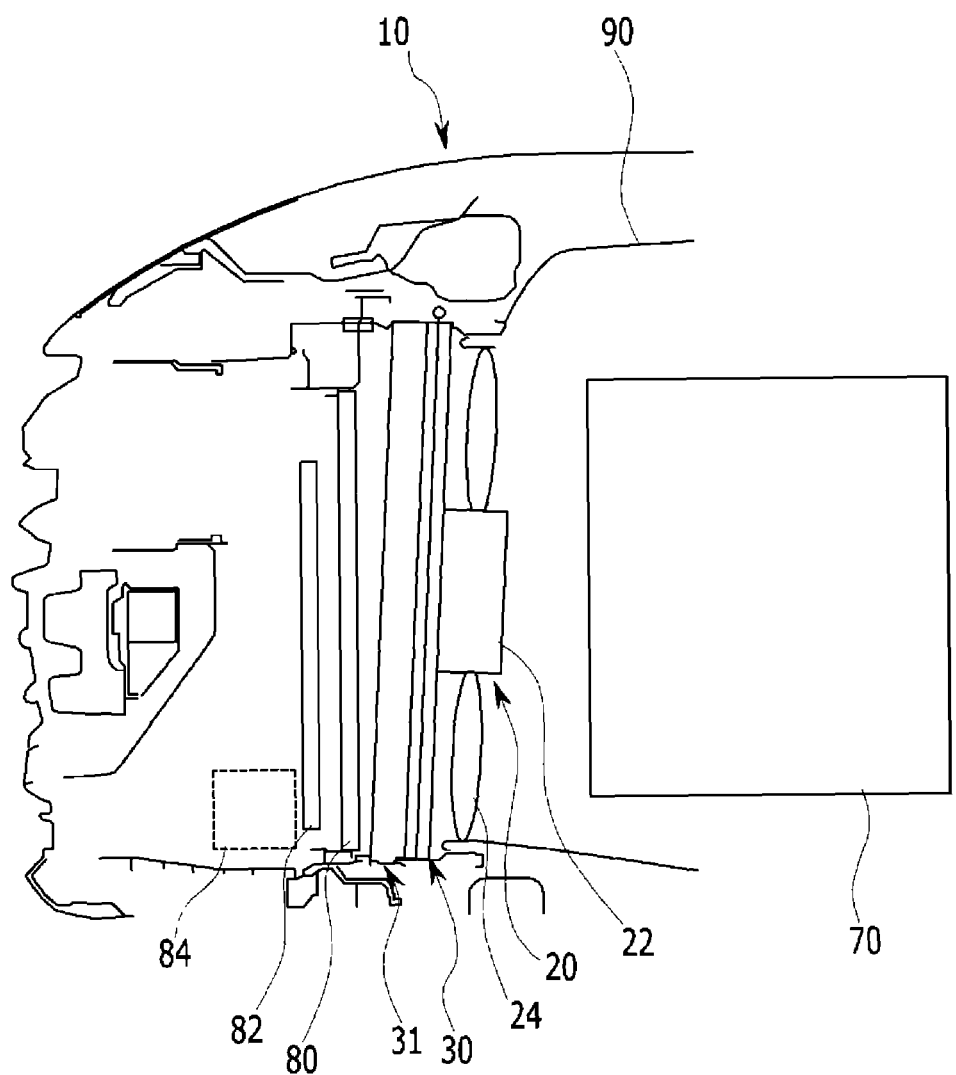
FIG. 1 is a cross-sectional view illustrating a system for controlling air flow to an engine room of a vehicle according to the present invention.
Figure 2:
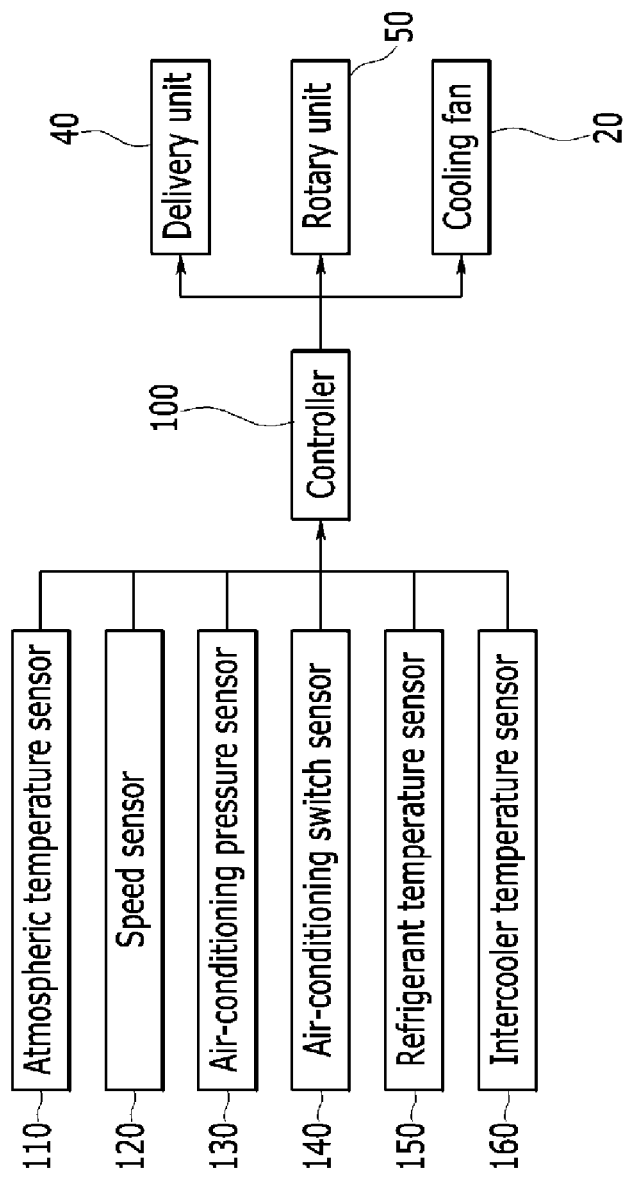
FIG. 2 is a bock diagram illustrating the system for controlling air flow to the engine room of the vehicle according the present invention.

FIG. 1 is a cross-sectional view illustrating a system for controlling air flow to an engine room of a vehicle according to various embodiments of the present invention, and FIG. 2 is a bock diagram illustrating a system for controlling air flow to an engine room of a vehicle according to various embodiments of the present invention.

Referring to FIGS. 1 and 2, the system for controlling air flow to an engine room of a vehicle according to various embodiments of the present invention includes a fan shroud 30 in which a cooling fan 20 including a fan motor 22 and a fan blade 24 is installed, an apparatus for controlling air flow to an engine room of a vehicle (or a vehicle engine room air flow control apparatus (or an air flow control apparatus 31)) controlling air flow introduced to an engine room of a vehicle, and a controller 100 controlling operations of the cooling fan 20 and the air flow control apparatus 31 according to operational states of the vehicle.

The air flow control apparatus 31 and the fan shroud 30 may be provided between an engine 70 and a radiator 80.

A condenser 82 may be provided in front of the radiator 80, and an intercooler 84 may be provided in front of the condenser 82.

The system for controlling air flow to an engine room of a vehicle according to various embodiments of the present invention may further include an encapsulation 90 covering the engine room. The encapsulation 90 suppresses transmission of noise and vibration generated in the engine 70 to the outside of a vehicle body 10 and guides running wind, which has been introduced to the engine room, to reduce drag.

The encapsulation 90 preserves heat generated by the engine 70 such that the engine 70 may be operated at the optimal operation temperature when the vehicle drives again within a predetermined period of time after it was stopped.

Referring to FIG. 2, the system for controlling air flow to an engine room of a vehicle includes an atmospheric temperature sensor 110 measuring an atmospheric temperature and outputting a corresponding signal, a speed sensor 120 measuring a speed of a vehicle and outputting a corresponding signal, an air-conditioning pressure sensor 130 measuring internal air-conditioning pressure and outputting a corresponding signal, an air-conditioning switch sensor 140 measuring an operating signal of an air-conditioning switch and outputting a corresponding signal, and a refrigerant temperature sensor 150 measuring a refrigerant temperature and outputting a corresponding signal. The controller 100 obtains the corresponding output signals from the sensors to determine an operational state of the vehicle, and controls operations of the cooling fan 20 and the air flow control apparatus 31.

The system for controlling air flow to an engine room of a vehicle may further include an intercooler temperature sensor 160 measuring a temperature of the intercooler 84 and outputting a corresponding signal. The controller 100 may further obtain a signal from the intercooler temperature sensor 160 to determine an operational state of the vehicle, and control operations of the cooling fan 20 and the air flow control apparatus 31.

Figure 3:
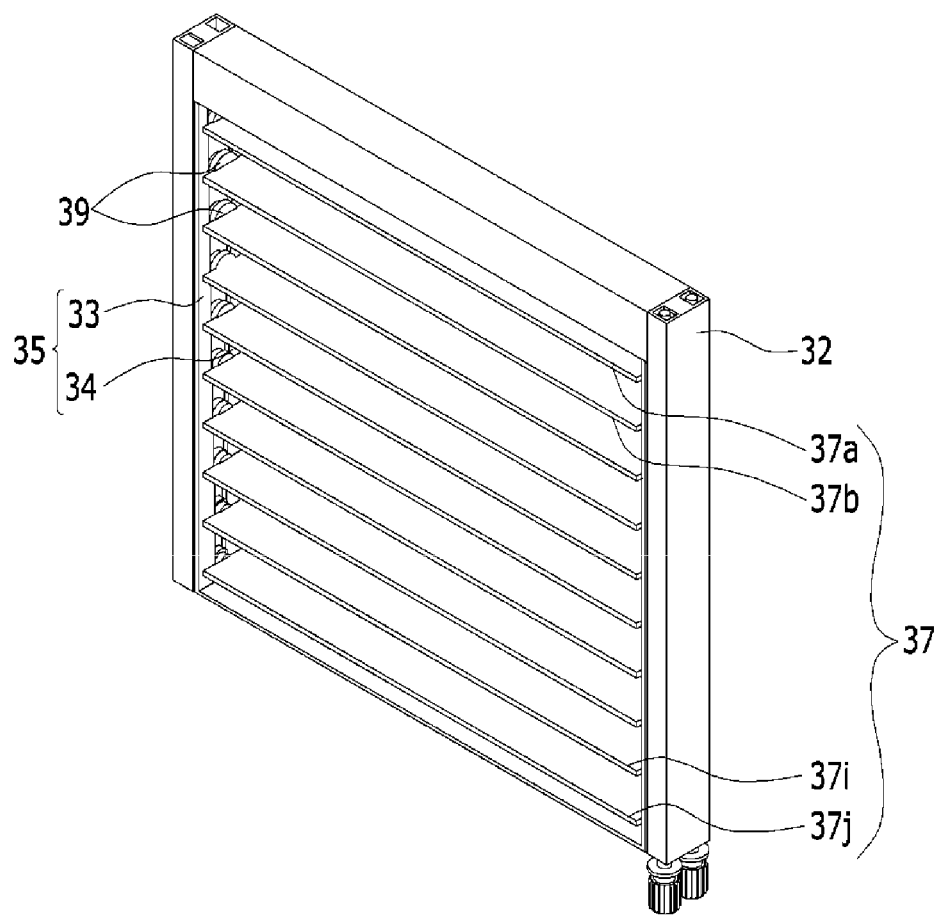
FIG. 3 is a perspective view of an exemplary apparatus for controlling air flow to an engine room of the vehicle according to the present invention.
Figure 4:
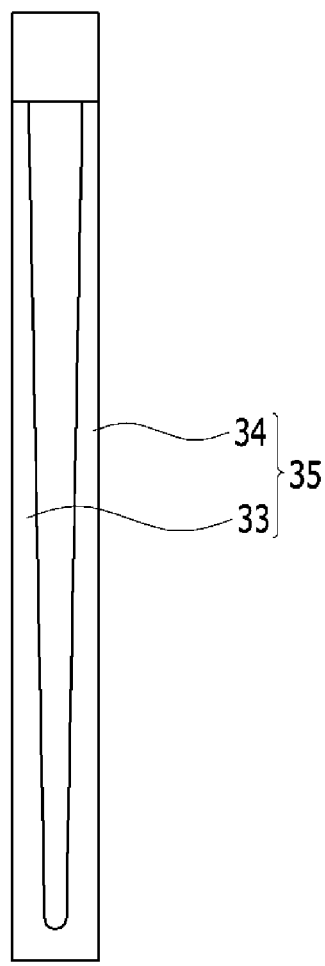
FIG. 4 is a view illustrating a guide rail of the exemplary apparatus for controlling air flow to the engine room of the vehicle according to the present invention.

FIG. 3 is a perspective view of an apparatus for controlling air flow to an engine room of a vehicle according to various embodiments of the present invention, and FIG. 4 is a view illustrating a guide rail of the apparatus for controlling air flow to an engine room of a vehicle according to various embodiments of the present invention.

Figure 5:
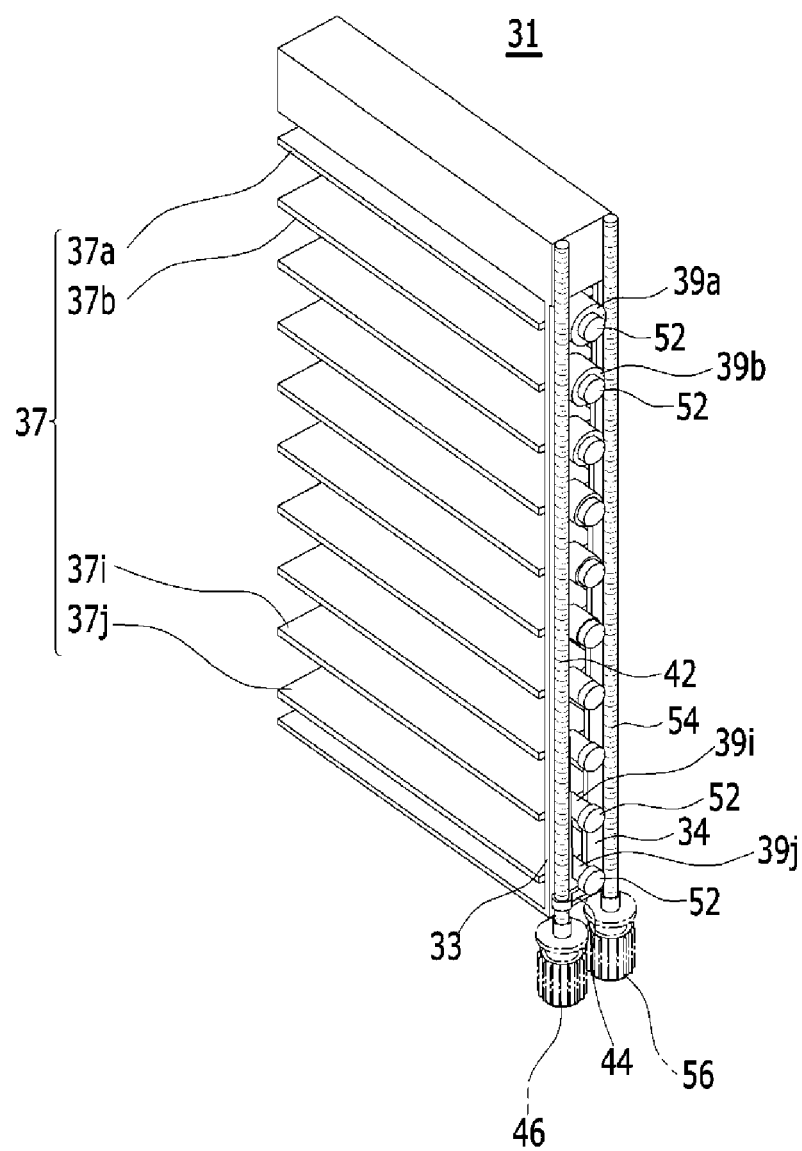
FIG. 5 is a partial perspective view of the exemplary apparatus for controlling air flow to the engine room of the vehicle according to the present invention.
Figure 6:
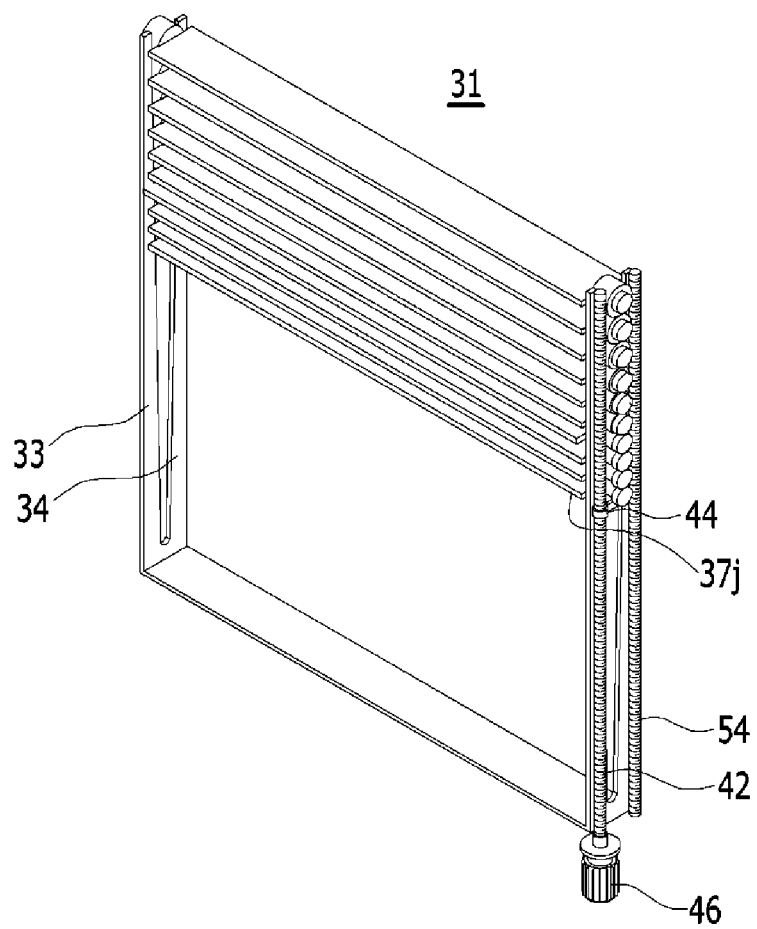
FIG. 6 is a perspective view illustrating a folded state of flaps of the apparatus for controlling air flow to the engine room of the vehicle according to the present invention.

FIG. 5 is a partial perspective view of the apparatus for controlling air flow to an engine room of a vehicle according to various embodiments of the present invention, and FIG. 6 is a perspective view illustrating a folded state of flaps of the apparatus for controlling air flow to an engine room of a vehicle according to various embodiments of the present invention.

Figure 7:
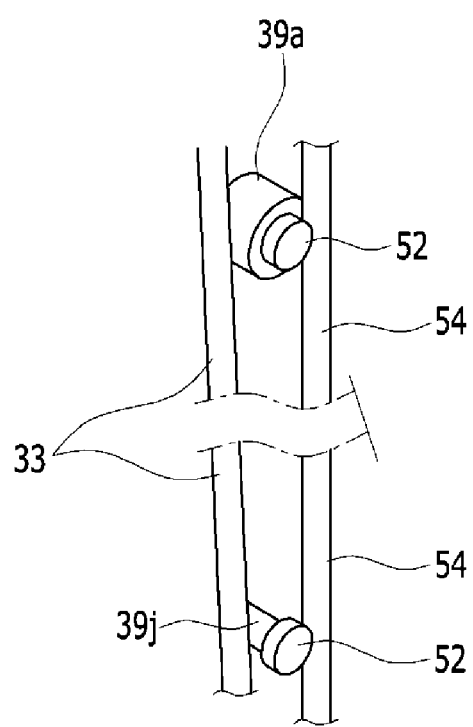
FIG. 7 is a perspective view illustrating a stopper and a rotary gear of the exemplary apparatus for controlling air flow to the engine room of the vehicle according to the present invention.
Figures 8A, 8B:
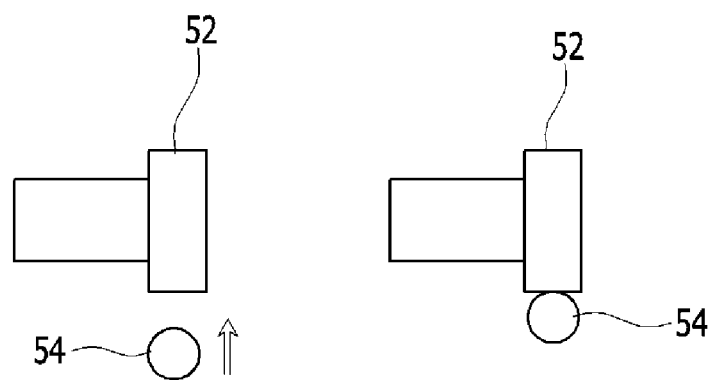
FIG. 8A and FIG. 8B are views illustrating a rotary gear and a rotary screw of the exemplary apparatus for controlling air flow to the engine room of the vehicle according to the present invention.

FIG. 7 is a perspective view illustrating a stopper and a rotary gear of the apparatus for controlling air flow to an engine room of a vehicle according to various embodiments of the present invention, and FIG. 8 is a view illustrating a rotary gear and a rotary screw of the apparatus for controlling air flow to an engine room of a vehicle according to various embodiments of the present invention.

Referring to FIG. 3, FIG. 4, FIG. 5, FIG. 6, FIG. 7 and FIG. 8, the apparatus for controlling air flow to an engine room of a vehicle according to various embodiments of the present invention includes vertical support units provided as a pair, a plurality of flaps 37 provided to be unfolded or folded in the vertical support units, a delivery unit 40 selectively unfolding the flaps 37, and a rotary unit 50 selectively rotating the flaps 37. The controller 100 controls operations of the delivery unit 40 and the rotary unit 50.

The vertical support units include a vertical support unit cover 32 and a guide rail 35 provided within the vertical support unit cover 32 and having a width narrowed downwardly. Stoppers 39 are provided in the plurality of flaps 37 and have a size corresponding to the width of the guide rail 35 such that the plurality of flaps 37 are placed in preset positions of the guide rail 35.

Namely, as illustrated in FIG. 4, the guide rail 35 includes a front guide rail 33 and a rear guide rail 34, and a distance between the front guide rail 33 and the rear guide rail 34 is reduced downwardly. Stoppers 39a to 39j respectively coupled to the plurality of flaps 37 are gradually reduced in size in proportion to the distance between the front guide rail 33 and the rear guide rail 34.

The delivery unit 40 may include a delivery screw 42 provided in any one of the guide rails, for example, the front guide rail 33, a delivery plate 44 supporting the lowermost flap 37j among the plurality of flaps 37, and engaged with the delivery screw 42 to adjust the position of the lowermost flap 37j when the delivery screw 42 rotates, and a delivery motor 46 selectively rotating the delivery screw 42.

The rotary unit 50 may include rotary gears 52 respectively coupled to the plurality of flaps 37, a rotary screw 54 provided in the other guide rail, for example, the rear guide rail 34, and selectively engaged with the rotary gears 52, and a rotary motor 56 selectively rotating the rotary screw 54.

The rotary motor 56 may be a servo motor which is able to rotate in forward and reverse directions and is controlled in revolution per minute (RPM) and rotating speed. By controlling a rotational direction and the RPM of the rotary motor 56, an operating angle of the plurality of flaps 37, namely, an area in which air passes through the plurality of flaps 37, may be varied.

The rotary screw 54 may be a flexible gear that can be selectively engaged with the rotary gears 52.

Figure 9:
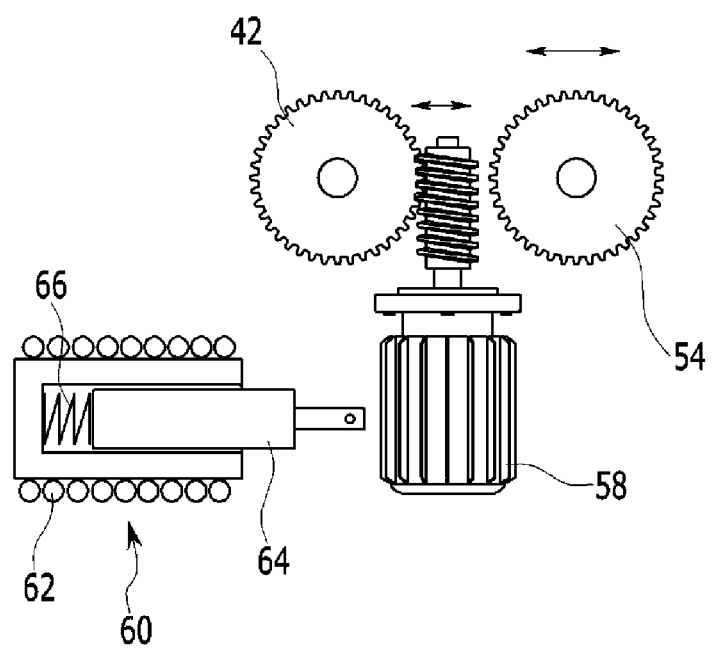
FIG. 9 is a view illustrating an operation conversion unit of the exemplary apparatus for controlling air flow to the engine room of the vehicle according to the present invention.

FIG. 9 is a view illustrating an operation conversion unit of the apparatus for controlling air flow to an engine room of a vehicle according to various embodiments of the present invention.

The apparatus for controlling air flow to an engine room of a vehicle according to various embodiments of the present invention may control operations of the delivery unit 40 and the rotary unit 50 by using a single operating motor.

Namely, referring to FIG. 5, FIG. 6, FIG. 7, FIG. 8 and FIG. 9, the delivery unit 40 may include the delivery screw 42 provided in any one of the guide rails 33 and the delivery plate 44 supporting the lowermost flap 37j among the plurality of flaps 37 and engaged with the delivery screw 42 to adjust the position of the lowermost flap 37j when the delivery screw 42 rotates. The rotary unit 50 may include the rotary gears 52 respectively coupled to the plurality of flaps 37 and the rotary screw 54 provided in the other guide rail 34 and selectively engaged with the rotary gears 52. The air flow control apparatus 31 according to various embodiments of the present invention may further include an operating motor 58 selectively rotating the delivery screw 42 or the rotary screw 54.

The operating motor 58 may be a servo motor which is able to rotate in forward and reverse directions and is controlled in RPM and rotating speed. By controlling a rotational direction and the RPM of the operating motor 58, an operating angle of the plurality of flaps 37, namely, an area in which air passes through the plurality of flaps 37, may be varied.

The air flow control apparatus 31 may further include an operation conversion unit 60 selectively engaging the operating motor 58 and the delivery screw 42 or the rotary screw 54.

For example, the operation conversion unit 60 may include a solenoid 62, a plunger 64, and a spring 66 provided between the solenoid 62 and the plunger 64 and selectively engage the operating motor 58 and the delivery screw 42 or the rotary screw 54 by adjusting the position of the operating motor 58 depending on whether a current is supplied to the solenoid 62.

The rotary screw 54 may be a flexible gear selectively engaged with the rotary gears 52, and as illustrated in FIGS. 8 and 9, in a state in which the rotary screw 54 and the rotary gears 52 are separated, when the operation conversion unit 60 pushes the operating motor 58 and the rotary screw 54, the rotary screw 54 is engaged with the rotary gears 52, the rotary screw 54 and the rotary gears 52 are rotated according to rotation of the operating motor 58, and an operating angle of the flaps 37 is adjusted.

Hereinafter, an operation of the apparatus for controlling air flow to an engine room of a vehicle according various embodiments of the present invention will be described with reference to FIG. 1, FIG. 2, FIG. 3, FIG. 4, FIG. 5, FIG. 6, FIG. 7, FIG. 8 and FIG. 9.

As illustrated in FIG. 6, in a state in which the plurality of flaps 37 are folded, when the controller 100 operates the delivery motor 46 according to an operational state of the vehicle, the delivery screw 42 rotates and the delivery plate 44 engaged with the delivery screw 42 descends.

Then, as illustrated in FIG. 5 and FIG. 7, the stoppers 39a to 39j respectively coupled to the plurality of flaps 37 are placed in positions in which the plurality of flaps 37 are set, respectively, according to sizes thereof to correspond to the distances between the front guide rail 33 and the rear guide rail 34.

Thereafter, when the controller 100 operates the rotary motor 56 according to an operational state of the vehicle, the rotary screw 54 rotates to rotate the rotary gears 52 to rotate the plurality of flaps 37, controlling air flow between the plurality of flaps 37.

When the plurality of flaps 37 are to be folded according to an operational state of the vehicle, the controller 100 controls the operations of the rotary motor 56 and the delivery motor 46 in the reverse order.

Here, when the rotary gears 52 rotate, the plurality of flaps 37 connected with the rotary gears 52 are also simultaneously rotated, but the stoppers 39, independent from the rotary gears 52, are not rotated but simply placed in the guide rail 35.

As illustrated in FIG. 9, in case of using the operating motor 58 instead of the rotary motor 56 and the delivery motor 46, the operation conversion unit 60 is operated to control operations of the delivery unit 40 and the rotary unit 50.

FIG. 10A, FIG. 10B, FIG. 10C and FIG. 10D are views illustrating operation modes of the apparatus for controlling air flow to an engine room of a vehicle according to various embodiments of the present invention.

Hereinafter, the apparatus for controlling air flow to an engine room of a vehicle according to various embodiments of the present invention will be described with reference to FIG. 1, FIG. 2, FIG. 10A, FIG. 10B, FIG. 10C and FIG. 10D.

Figure 10D:
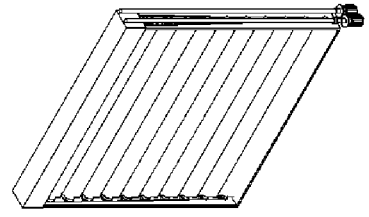
FIG. 10A, FIG. 10B, FIG. 10C and FIG. 10D are views illustrating operation modes of the exemplary apparatus for controlling air flow to the engine room of the vehicle according to the present invention.
Figure 10C:
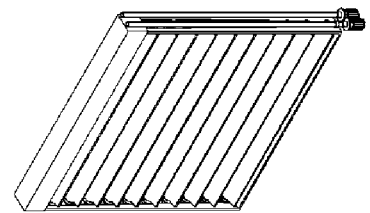
Figure 10B:
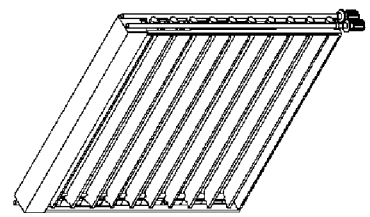
Figure 10A:
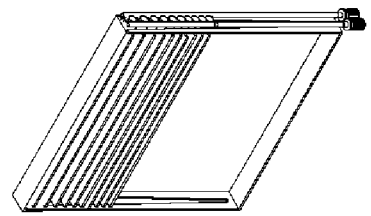

Operation modes of the system for controlling air flow to an engine room of a vehicle may include a first mode in which the plurality of flaps 37 are unfolded to be completely closed and the cooling fan 20 is turned off as illustrated in FIG. 10A, a second mode in which an operating rotational angle of the flaps 37 in the unfolded state is controlled and the cooling fan 20 is turned off as illustrated in FIG. 10B, a third mode in which the plurality of flaps 37 in the unfolded state are completely opened and the cooling fan 20 is turned off as illustrated in FIG. 10C, and a fourth mode in which the plurality of flaps 37 are folded and an operation of the cooling fan 20 is controlled as illustrated in FIG. 10D.

The first mode may be a state in which aerodynamic performance is required or cooling is not required, for example, a state in which the engine 70 of the vehicle, upon being started, is required to be warmed up for a predetermined period of time, a state in which the engine is tuned off and a temperature of the engine 70 is required to be maintained, a state in which the vehicle is running in a high speed and low load state, and the like. The corresponding conditions may be stored in a preset map in advance, and the controller 100 may compare an operational state of the vehicle with the map to determine whether the vehicle corresponds to the first mode.

The second mode may be a state in which both aerodynamic performance and cooling are optimized. The second mode may be executed by controlling an opening area of the flaps 37 without operating the cooling fan 20 and may be a low speed state. The corresponding conditions may be stored in advance in a preset map. The controller 100 may compare an operational state of the vehicle with the map to determine whether the vehicle corresponds to the second mode.

The third mode may be a mode corresponding to a high speed, high load condition, and may be a state in which the engine 70 can be cooled without operating the cooling fan 20 in the high speed state. The corresponding conditions may be stored in a preset map in advance, and the controller 100 may compare an operational state of the vehicle with the map to determine whether the vehicle corresponds to the third mode.

The fourth mode may be a state in which cooling performance is maintained under a low speed, high load condition, and an operation of the cooling fan 20 may be determined according to a temperature of a coolant, a vehicle speed, and the like. The corresponding conditions may be stored in a preset map in advance, and the controller 100 may compare an operational state of the vehicle with the map to determine whether the vehicle corresponds to the fourth mode.

The low speed or high speed condition may be, for example, that a vehicle speed is approximately 30 to 40 kph or 90 to 110 kph, respectively, but the present invention is not limited thereto. Also, as for a load condition, for example, 2000 to 4000 of engine RPM may be determined as a low load or high load state, but the present invention is not limited thereto.

As described above, in the apparatus for controlling air flow to an engine room of a vehicle and the air flow control system including the same according to various embodiments of the present invention, cooling performance can be enhanced by controlling the use of the cooling fan according to running states of a vehicle and aerodynamic performance can be enhanced by adjusting air flow introduced to a vehicle.

For convenience in explanation and accurate definition in the appended claims, the terms "upper", "lower", "inner"

and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling air flow to an engine room of a vehicle, the apparatus comprising:
    vertical support units provided as a pair;
    a plurality of flaps provided to be unfolded or folded in the vertical support units;
    a delivery unit configured to selectively fold or unfold the flaps;
    a rotary unit configured to selectively rotate the flaps; and
    a controller configured to control operations of the delivery unit and the rotary unit according to operational states of a vehicle.

2. The apparatus of claim 1, wherein the vertical support units include guide rails having a width narrowed downwardly, wherein stoppers are provided in the plurality of flaps and have sizes corresponding to widths of the guide rails such that the plurality of flaps are placed in preset positions of the guide rails.

3. The apparatus of claim 2, wherein the delivery unit includes:
    a delivery screw provided in any one of the guide rails;
    a delivery plate supporting a lowermost flap among the plurality of flaps, and engaged with the delivery screw to adjust a position of the lowermost flap when the delivery screw rotates; and
    a delivery motor selectively rotating the delivery screw.

4. The apparatus of claim 3, wherein the rotary unit includes:
    rotary gears respectively coupled to the plurality of flaps;
    a rotary screw provided in another guide rail and selectively engaged with the rotary gears; and
    a rotary motor selectively rotating the rotary screw.

5. The apparatus of claim 4, wherein the rotary motor is a servo motor configured to rotate in forward and reverse directions and is controlled in revolutions per minute (RPM) and rotating speed.

6. The apparatus of claim 4, wherein the rotary screw is a flexible gear configured to be selectively engaged with the rotary gears.

7. The apparatus of claim 2, further comprising:
    an operating motor selectively rotating a delivery screw or a rotary screw,
    wherein the delivery unit includes:
    the delivery screw provided in any one of the guide rails; and
    a delivery plate supporting a lowermost flap among the plurality of flaps and engaged with the delivery screw to adjust a position of the lowermost flap when the delivery screw rotates, and
    the rotary unit includes:
    rotary gears respectively coupled to the plurality of flaps; and
    the rotary screw provided in another guide rail and selectively engaged with the rotary gears.

8. The apparatus of claim 7, wherein the operating motor is a servo motor configured to rotate in forward and reverse directions and controlled in RPM and rotating speed.

9. The apparatus of claim 7, wherein the rotary screw is a flexible gear that is configured to be selectively engaged with the rotary gears.

10. The apparatus of claim 7, further comprising:
    an operation conversion unit selectively engaging the operating motor and the delivery screw or the rotary screw.

11. A system for controlling air flow to an engine room of a vehicle, the system comprising:
    a fan shroud in which a cooling fan including a fan motor and a fan blade is installed;
    an apparatus for controlling the air flow to the engine room of the vehicle including vertical support units provided as a pair, a plurality of flaps provided to be unfolded or folded in the vertical support units, a delivery unit configured to selectively fold or unfold the flaps, and a rotary unit configured to selectively rotate the flaps; and
    a controller configured to control operations of the delivery unit, the rotary unit, and the cooling fan according to operational states of the vehicle.

12. The system of claim 11, wherein the fan shroud and the apparatus for controlling the air flow to the engine room of the vehicle are provided between an engine and a radiator.

13. The system of claim 12, further comprising an encapsulation covering the engine.

14. The system of claim 12, wherein operation modes of the system for controlling the air flow to the engine room of the vehicle include:
    a first mode in which the plurality of flaps are unfolded to be completely closed and the cooling fan is turned off;
    a second mode in which an operating rotational angle of the plurality of flaps in the unfolded state is controlled and the cooling fan is turned off;
    a third mode in which the plurality of flaps in the unfolded state are completely opened and the cooling fan is turned off; and
    a fourth mode in which the plurality of flaps are folded and an operation of the cooling fan is controlled.

15. The system of claim 14, further comprising an atmospheric temperature sensor configured to measure an atmospheric temperature and output a corresponding signal; a speed sensor configured to measure a speed of the vehicle and output a corresponding signal; an air-conditioning pressure sensor configured to measure internal air-conditioning pressure and output a corresponding signal; an air-conditioning switch sensor configured to measure an operating signal of an air-conditioning switch and output a corresponding signal; and a refrigerant temperature sensor configured to measure a refrigerant temperature and output a corresponding signal,
    wherein the controller determines an operational state of the vehicle based on the corresponding signals from the sensors, and controls operations of the delivery unit, the rotary unit, and the cooling fan in any one of the first to fourth modes according to the operational state of the vehicle.

16. The system of claim 15, further comprising an intercooler temperature sensor configured to measure a temperature of the intercooler and output a corresponding signal, wherein the controller further obtains a signal from the intercooler temperature sensor to determine an operational state of the vehicle, and controls operations of the delivery unit, the rotary unit, and the cooling fan in any one of the first to fourth modes.

\* \* \* \* \*